(12) United States Patent
Majmundar et al.

(10) Patent No.: US 9,237,467 B2
(45) Date of Patent: Jan. 12, 2016

(54) ADAPTIVE PACING OF MEDIA CONTENT DELIVERY OVER A WIRELESS NETWORK

(71) Applicant: AT&T Intellectual Property I, L.P., Atlanta, GA (US)

(72) Inventors: Milap V. Majmundar, Austin, TX (US); Arvind R. Raghavan, Burlingame, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 14/092,340

(22) Filed: Nov. 27, 2013

(65) Prior Publication Data

US 2015/0146552 A1    May 28, 2015

(51) Int. Cl.
*H04W 24/08*    (2009.01)
*H04W 28/10*    (2009.01)
*H04W 28/02*    (2009.01)

(52) U.S. Cl.
CPC .......... *H04W 24/08* (2013.01); *H04W 28/0231* (2013.01); *H04W 28/10* (2013.01)

(58) Field of Classification Search
None
See application file for complete search history.

(56) References Cited

U.S. PATENT DOCUMENTS

| | | | |
|---|---|---|---|
| 6,560,243 B1 | 5/2003 | Mogul | |
| 6,603,975 B1 * | 8/2003 | Inouchi et al. | 455/450 |
| 6,778,507 B1 | 8/2004 | Jalali | |
| 6,894,974 B1 | 5/2005 | Aweva et al. | |
| 7,457,313 B2 | 11/2008 | Patrick | |
| 7,464,172 B2 | 12/2008 | Deshpande | |
| 7,779,146 B2 | 8/2010 | Deshpande | |
| 8,135,852 B2 | 3/2012 | Nilsson et al. | |
| 8,175,175 B1 * | 5/2012 | Strasman et al. | 375/260 |
| 8,417,828 B2 | 4/2013 | Ma et al. | |
| 8,477,608 B2 | 7/2013 | Ludwig et al. | |
| 2005/0204247 A1 * | 9/2005 | Guo et al. | 714/746 |
| 2009/0089447 A1 | 4/2009 | Balachandran et al. | |
| 2010/0246469 A1 * | 9/2010 | Gheorghiu et al. | 370/312 |
| 2011/0122794 A1 * | 5/2011 | Kim et al. | 370/252 |
| 2012/0069829 A1 * | 3/2012 | Cote et al. | 370/338 |
| 2013/0017815 A1 * | 1/2013 | Damola et al. | 455/418 |

(Continued)

FOREIGN PATENT DOCUMENTS

| | | |
|---|---|---|
| EP | 0948168 A1 | 10/1999 |
| EP | 1521476 A1 | 4/2005 |
| EP | 1993237 A2 | 11/2008 |
| EP | 2228917 A1 | 9/2010 |
| EP | 2256945 A2 | 12/2010 |

(Continued)

OTHER PUBLICATIONS

International Search Report and Written Opinion Application No. PCT/US2014/066290 mailed Feb. 25, 2015, 11 Pages.

(Continued)

*Primary Examiner* — Hong Cho
(74) *Attorney, Agent, or Firm* — Toler Law Group, PC

(57) ABSTRACT

A method includes monitoring, at a base station of a wireless network, channel quality information corresponding to a wireless channel used by the base station to stream media content to a communication device. The media content is streamed to the communication device at a particular effective transfer rate via data bursts. The method includes selecting, at the base station, a size of a data burst to send to the communication device and a download rate for the data burst. The size and the data rate are based on the channel quality information. The method also includes sending the data burst to the communication device at a first time from the base station.

20 Claims, 6 Drawing Sheets

(56) References Cited

U.S. PATENT DOCUMENTS

2013/0028088 A1* 1/2013 Do et al. ............... 370/235
2014/0105019 A1* 4/2014 Harrang et al. ........ 370/235

FOREIGN PATENT DOCUMENTS

| WO | 2004091151 A1 | 10/2004 |
| WO | 2009000012 A1 | 12/2008 |
| WO | 2013008054 A1 | 1/2013 |

OTHER PUBLICATIONS

"Cisco ASR 5000 Series Mobile Video Gateway Administration Guide," OL-24501-02, Nov. 17, 2011, Version 12.0, Cisco Systems, Incorporated, San Jose, California, pp. 1-108.

Beck, P. et al., "Adaptive streaming of high-quality video over wireless LANs," Visual Communications and Image Processing 2004, Copyright 2003, vol. 5308, Society of Photo-Optical Instrumentation Engineers, Bellingham, Washington, 14 pages.

Ku, J. et al, "On the Performance of Broadband Mobile Internet Access System," 1st International Symposium on Wireless Pervasive Computing, 2006, IEEE, Piscataway, New Jersey, pp. 1-6.

Lee, C. et al., "Adaptive UEP and Packet Size Assignment for Scalable Video Transmission over Burst-Error Channels," EURASIP Journal on Advances in Signal Processing, Feb. 8, 2006, vol. 2006, Hindawi Publishing Corporation, Cairo, Egypt, pp. 1-9.

Mansour, M. et al., "Channel Aware Multi-User Scalable Video Streaming over Lossy Under-Provisioned Channels: Modeling and Analysis," IEEE Transactions on Multimedia, Nov. 7, 2008, vol. 10, Issue 7, IEEE, Piscataway, New Jersey, pp. 1366-1381.

* cited by examiner

ADAPTIVE PACING OF MEDIA CONTENT DELIVERY OVER A WIRELESS NETWORK

FIELD OF THE DISCLOSURE

The present disclosure is generally related to adaptive pacing of media content delivery over a wireless network.

BACKGROUND

A user of a communication device may choose to view media content (e.g., video content) on a display of the communication device. The media content may be streamed to the communication device via a wireless network. A base station or multiple base stations may stream the media content to the communication device. Streaming content indicates that the user may begin playback of the media content before all of the media content is delivered to the communication device. Delivery of the media content to the communication device may be paced by transmitting data in bursts to the communication device. However, pacing transmission of the data may limit the base station's ability to use resources (e.g., radio resources) of the base station efficiently.

DETAILED DESCRIPTION

Figure 1:
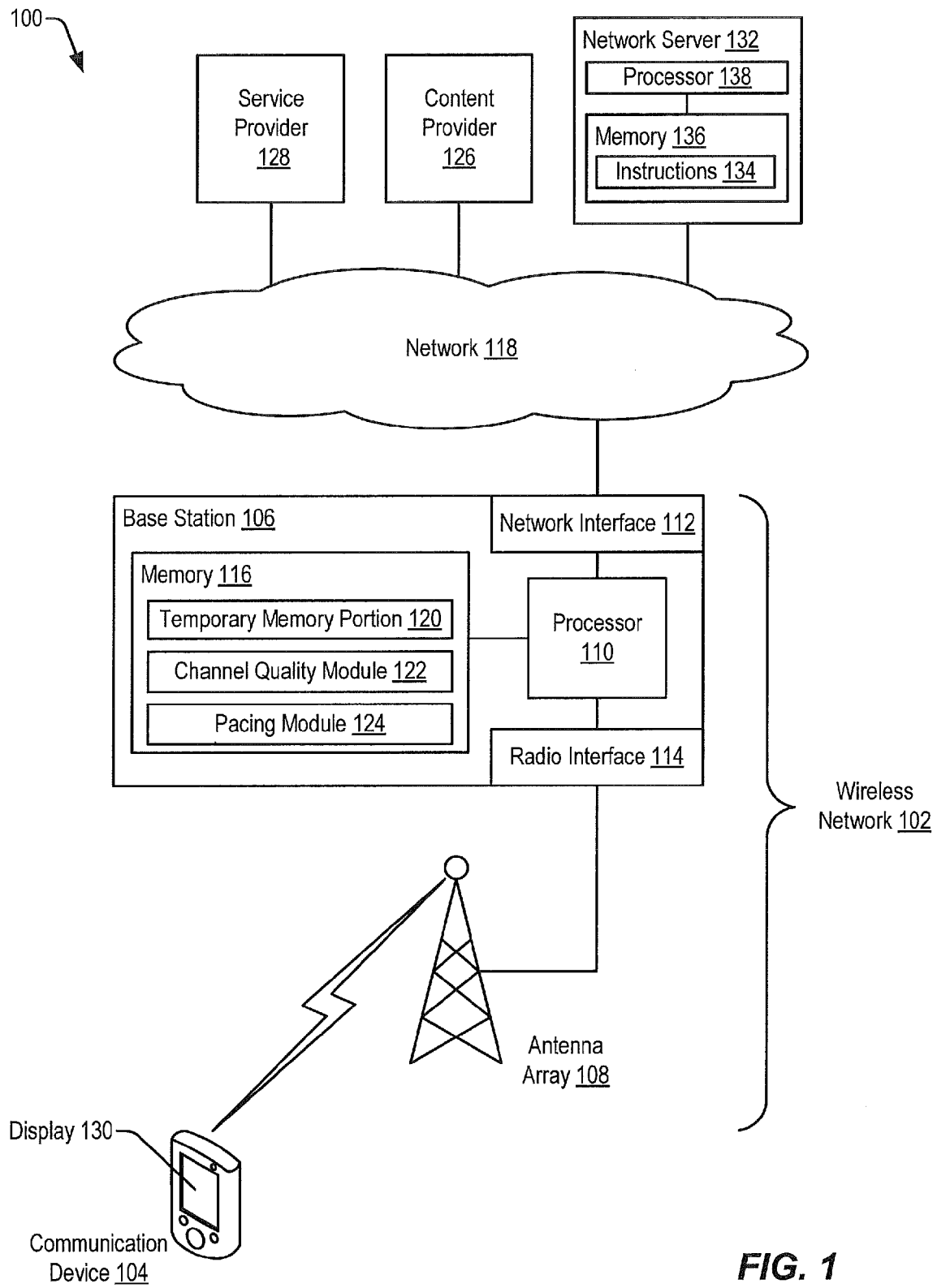
FIG. 1 is a diagram of an embodiment of a system to provide adaptive pacing of media content delivery over a wireless network.

Media content may be streamed to a communication device by a base station of a wireless network. The media content may be streamed to the communication device using a pacing technique. Pacing techniques transmit the media content using data bursts. Each data burst may be transmitted at a transmission rate of the wireless network. Due to delay between transmission of each data burst, an effective transfer rate of the media content may be less than the transmission rate of the wireless network. Thus, the effective transfer rate corresponds to a delivery rate of the media content as though the base station continuously sent the media content to the communication device (e.g., rather than sending the media content in data bursts). The effective transfer rate may be greater than or equal to a playback rate of the media content.

Conventional pacing techniques used fixed rate pacing, which may be referred to as smooth pacing or coarse pacing. For smooth pacing, a relatively small amount of data is transmitted in each data burst. Thus, with smooth pacing, a base station may frequently transmit small data bursts to the communication device. Because the data bursts are small, little data may be "wasted" (e.g., transmitted but not consumed by a user) if the user stops playback of the media content (before completion of playback of the delivered media content). However, with smooth pacing, usage efficiency of base station resources of the base station that delivers the media content to the communication device may be limited since the base station is not able to take advantage of favorable channel conditions as such conditions arise.

For coarse pacing, a relatively large amount data is transmitted in each data burst. The base station may transmit the bursts to the communication device less frequently than in smooth pacing, and the base station may delay or advance transmission of each burst to take advantage of favorable channel conditions. However, because the size of each data burst is large, more data may be wasted if the user stops playback of the media content (before completion of playback of the delivered media content). Thus, course pacing enables efficient use of base station resources but may result in increased data wastage.

In a particular embodiment, the base station adaptively selects a data burst size. For example, the base station may determine an indicator of channel quality of a channel used to provide the media content to the communication device. The base station may use the indicator of channel quality to determine a size of a data burst of media content to send to the communication device. The base station may also use the indicator of channel quality to determine a download rate for the data burst.

Adaptively selecting the size of the data bursts and the download rate to the communication device may enable the base station to provide more efficient delivery of media content to the communication device as compared to media content delivery using smooth pacing or coarse pacing. Adjusting the size of the data bursts and the download rate to the communication device may provide a balance between inhibiting wastage of data in the data bursts and increasing usage efficiency of base station resources.

Traffic in wireless networks associated with media content is expected to grow significantly as a part of the total traffic delivered over wireless networks. Efficient delivery of traffic associated with media content may enable wireless carriers to manage demand of traffic growth while receiving a return on investment on capital expenditures associated with maintaining and improving the wireless networks. Increasing the efficiency of delivery of media content by adjusting the size of data bursts and the download rate of the data bursts may increase capacity of wireless spectrum. The increase in capacity of the wireless spectrum may be due to use of fewer resources to send media content while limiting wasted data should playback of the media content be stopped. The increase in capacity of the wireless spectrum may be used to allow other traffic in the wireless networks or may be utilized to decrease congestion and interference in the wireless networks. Increasing the efficiency of media content delivery may also delay capital expenditures needed to increase capacity of wireless networks.

In a particular embodiment, a method includes monitoring, at a base station of a wireless network, channel quality information corresponding to a wireless channel used by the base station to stream media content to a communication device. The media content is streamed to the communication device at a particular effective transfer rate via data bursts sent at download rates to the communication device. The method includes selecting, at the base station, a size of a data burst to send to the communication device and a download rate for the data burst. The size and the data rate are based on the channel quality information. The method also includes sending the data burst to the communication device at a first time from the base station.

In a particular embodiment, a system includes a processor and a memory coupled to the processor. The memory includes instructions executable by the processor to perform operations. The operations include monitoring channel quality information corresponding to a wireless channel used by a base station to stream media content to a communication device. The media content is streamed to the communication device at a particular effective transfer rate via data bursts of the media content sent at download rates to the communication device. The operations include selecting a size of a data burst to send to the communication device and a download rate for the data burst. The size and the download rate are based on the channel quality information. The operations also include sending the data burst to the communication device.

In a particular embodiment, a computer-readable storage device includes instructions executable by a processor to perform operations. The operations include monitoring channel quality information corresponding to a wireless channel used by a base station to stream media content to a communication device. The media content is streamed to the communication device at a particular effective transfer rate via data bursts of the media content sent at download rates to the communication device. The operations include selecting a size of a data burst to send to the communication device and a download rate for the data burst. The size and the download rate are based on the channel quality information. The operations also include sending the data burst to the communication device.

FIG. 1 is a block diagram of a particular embodiment of a system 100 to provide adaptive pacing of media content delivery over a wireless network 102 to a communication device 104 via a base station 106. The base station 106 may deliver the media content to the communication device 104 via data bursts. The base station 106 may provide adaptive pacing by selecting sizes of data bursts (i.e., amounts of data) and download rates of the data bursts to the communication device 104. Providing adaptive pacing may enable the base station 106 to efficiently use resources of the base station 106 to allow the base station 106 to take advantage of favorable channel conditions to transmit more data. Additionally, adaptive pacing may limit an amount of data that may be wasted if a user of the communication device 104 stops playback of the media content. For example, a potential amount of wasted data for a data burst may be directly proportional to a size of the data burst and may be directly proportional to a download rate of the data burst to the communication device 104. Usage efficiency of base station resources may be inversely proportional to the size of the data burst and inversely proportional to the download rate of the data burst to the communication device 104. Thus, selecting the size of the data burst and the download rate may be a balance between competing interests of having limited potential wasted data and having a high usage efficiency of base station resources. By adaptively selecting a data burst size for paced transmission based on channel conditions, these competing interests can be balanced to both limit wasted data and improve efficiency of use of base station resources.

The wireless network 102 may include a plurality of base stations (such as the representative base station 106) that send data to communication devices via wireless transmissions. The communication device 104 may receive data from the base station 106 while in a coverage area of the base station 106. If the communication device 104 moves out of the coverage area associated with the base station 106, the communication device 104 may continue to be coupled to the wireless network 102 via a different base station (not shown).

The communication device 104 may be a mobile communication device (e.g., a smart phone), a tablet computer, a lap top computer, a personal digital assistant, other type of communication device, or a combination thereof. The communication device 104 may communicate with the base station 106 via an antenna 108 while the communication device 104 is in the coverage area of the base station 106. The communication device 104 may be coupled to another communication device or other type of device (e.g., a data server or content provider) via the base station 106. While the communication device 104 is in the coverage area of the base station 106, control signals may be communicated with the base station 106. The control signals may be used by the base station 106 to monitor quality of a channel used to communicate with the communication device 104. The base station 106 and the communication device 104 may communicate using one or more wireless cellular data communication compliant standards including orthogonal frequency division multiple access (OFDMA), code division multiple access (CDMA), time division multiple access (TDMA), frequency division multiple access (FDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, or any combination thereof.

The base station 106 may include a processor 110. The processor 110 may be coupled to a network interface 112, a radio interface 114, and a memory 116. The network interface 112 may enable the base station 106 to communicate with a network 118. The network 118 may be a public or private internet protocol network (e.g., the internet). The radio interface 114 may enable the base station 106 to communicate with communication devices, including the communication device 104, located in the coverage area of the base station 106. The radio interface 114 may use a communication protocol compliant with the one or more wireless cellular data communication compliant standards.

The memory 116 may store data including settings, incoming and outgoing data for communication devices within the coverage area, and other information. The incoming and outgoing data for communication devices within the coverage area may be stored in a temporary memory portion 120 of the memory 116. The data may also include instructions executable by the processor 110 to perform tasks. For purposes of description, instructions for the base station 106 are illustrated in FIG. 1 as organized in functional modules. For example, the memory 116 may include a channel quality module 122 to determine channel quality information associated with channels used to communicate with communication devices in the coverage area, and a pacing module 124 that determines when to send data bursts, sizes of data bursts, and download rates for sending data bursts to communication devices in the coverage area that are receiving, or are going to receive, streaming media content.

The channel quality module 122 may monitor channel quality using any of a variety of techniques. For example, the channel quality module 122 may monitor signal strength of signals received from communication devices and content of control signals received from the communication devices to determine channel quality information for channels used to send data to the communication devices. The channel quality of a channel used by the communication device 104 may be affected by a number of factors, including, but not limited to, distance between the communication device 104 and the antenna 108, obstructions between the communication device 104 and the antenna 108, a number of communication devices currently supported by the base station 106, interference, other factors, or combinations thereof. The channel quality module 122 may determine an indicator of channel quality for the channel used by the communication device 104. In some embodiments, the indicator of channel quality may be a moving average of signal strength, or other channel quality indicator, for a time interval (e.g., 10 milliseconds (ms), 50 ms, 100 ms, or another time period). The indicator of channel quality for the communication device 104 may be provided as input to the pacing module 124.

For streaming of the media content to the communication device 104, the pacing module 124 may receive from the processor 110 an effective transfer rate and indicators of the channel quality provided from the channel quality module 122. The effective transfer rate may be chosen based on a playback rate of the media content. In some embodiments, the effective transfer rate may be the playback rate. In other embodiments, the effective transfer rate may be greater than the playback rate.

The pacing module 124 may use the effective playback rate and the indicator of channel quality to determine a time to send a data burst to the communication device 104, a size of the data burst, and a download rate for the data burst. The time to send the data burst may be determined based on the effective transfer rate, a time when a previous data burst was sent to the communication device 104, and a size of the previous data burst. The size of the data burst and the download rate for the data burst may be determined based on the indicator of channel quality. The size of the data burst may be determined to limit wastage of data, to efficiently use base station resources, or both.

In an embodiment, a balance between competing interests of limiting wastage of data (e.g., a first interest) and efficient use of base station resources (e.g., a second interest) may be accomplished by determining the size of the data burst as a weighted average of a first size based on the first interest and a second size based on the second interest. Values of weights for the first size and the second size may be determined based on the indicator of channel quality, based on information (e.g., trends) associated with playback of the media content, based on viewing history data associated with the media content, based on viewing history data associated with the communication device 104, based on other information, or combinations thereof. The viewing history data associated with the media content may be received at the base station 106 via the network 118 from a content provider 126 of the media content or from another source. The viewing history data associated with the communication device 104 may be received at the base station 106 from the communication device 104, from a service provider 128 associated with the communication device 104 via the network 118, from another source, or from combinations thereof.

A user of the communication device 104 may use the communication device 104 to receive and play media content via the wireless network 102. The media content may be a movie, a television program, a podcast, a video from a web page, another type of media content, or a combination thereof, that is available from the content provider 126 via the network 118. The media content may be streamed to the communication device 104 by the base station 106 via the antenna 108 for playback to a display 130 of the communication device 104.

When the user elects to stream the media content, the communication device 104 may send a request for the media content to the content provider 126 via the wireless network 102 and the network 118. Verification may be performed to ensure that the communication device 104 is entitled to receive the media content. When the communication device 104 is entitled to receive the media content, the base station 106 may receive the media content from the content provider 126 via the network 118. The base station 106 may receive the media content from the content provider 126 at a delivery rate that is substantially greater than a playback rate used by the communication device 104 to send the media content to the display 130. In some embodiments, the base station 106 may also receive information that enables the base station 106 to adaptively pace delivery of the media content to the communication device 104.

The base station 106 may store the media content received from the content provider 126 in the temporary memory portion 120 of the memory 116. The processor 110 may use the channel quality module 122 to determine a channel quality indicator of the channel used to send data to the communication device 104. The processor 110 may provide the channel quality indicator to the pacing module 124. The pacing module 124 may use the channel quality indicator to determine a size of a first data burst and a download rate for the first data burst of the streaming media content to be sent to the communication device 104.

The processor 110 may use the pacing module 124 and the channel quality indicator to determine the download rate for the first data burst. For example, the channel quality indicator may indicate channel conditions that enable use of a faster download rate or channel conditions that favor use of a slower download rate. The download rate may also be selected based on other factors, such as a number of other devices to which the base station 106 is transmitting media content at a particular time. The processor 110 may also use the pacing module 124 and the channel quality indicator to determine the size of the first data burst. The size of the first data burst may be determined to limit data wastage and to efficiently use base station resources. For example, a two factor optimization process may be used, where a first factor corresponds to an interest in limiting waste data and a second factor corresponds to an interest in using resources of the base station 106 efficiently. To illustrate, the pacing module 124 may determine a first size to limit waste data based on current channel conditions, may determine a second size to efficiently utilize base station resources based on current channel conditions, and may determine the size of the first data burst based on the first size, the second size, or both.

After the size of the first data burst is selected, the processor 110 may retrieve data corresponding to the size from the temporary memory portion 120. The processor 110 may send the data as the first data burst to the communication device 104 at the download rate.

The processor 110 may select a data burst size for each data burst based on channel conditions until playback of the media content is stopped (e.g., the user stops playback or the communication device 104 is turned off) or until an end of the media content is reached. For example, after the first data burst is sent, the processor 110 may determine a time when a next data burst is to be sent, the processor 110 may determine an updated channel quality indicator, the processor 110 may determine a size of the next data burst and a download rate for the next data burst based on the current channel quality indicator, and the processor 110 may send the next data burst. Thus, by monitoring channel conditions, the base station 106 may adaptively select data burst sizes to balance competing interests of limiting waste data and using base station resources efficiently.

In some embodiments, the functionality of the pacing module 124 may be performed by a network server 132 instead of by the base station 106. The functionality of the pacing module 124 may be stored as instructions 134 in a memory 136 of the network server 132. The instructions 134 may be executable by a processor 138 of the network server 132. The network server 132 may be within a relatively close physical distance of the base station 106 to enable rapid exchange of information with the base station 106 (e.g., receiving channel quality estimates determined by the base station 106). The network server 132, which implements the functionality of the pacing module 124, may communicate with the base station 106 to jointly implement adaptive pacing of streaming media content delivered to the communication device 104. In a first particular embodiment, the network server 132 and the base station 106 may share functionality of the pacing module 124. The network server 132 may receive channel quality information from the base station 106, and the network server 132 may send a download rate for a next data burst and a size of the next data burst determined by the processor 138 implementing the instructions 134 to the base station 106. The base station 106 may send the next data burst at an appropriate time to maintain the effective transfer rate. In a second particular embodiment, the functionality of the pacing module 124 resides at the network server 132. The network server 132 may receive channel quality information from the base station 106, and the network server 132 may send the next data burst to the base station 106 substantially at an appropriate time to maintain the effective transfer rate. The base station 106 may send the next data burst to the communication device 104 when the next burst is received.

Figure 2:
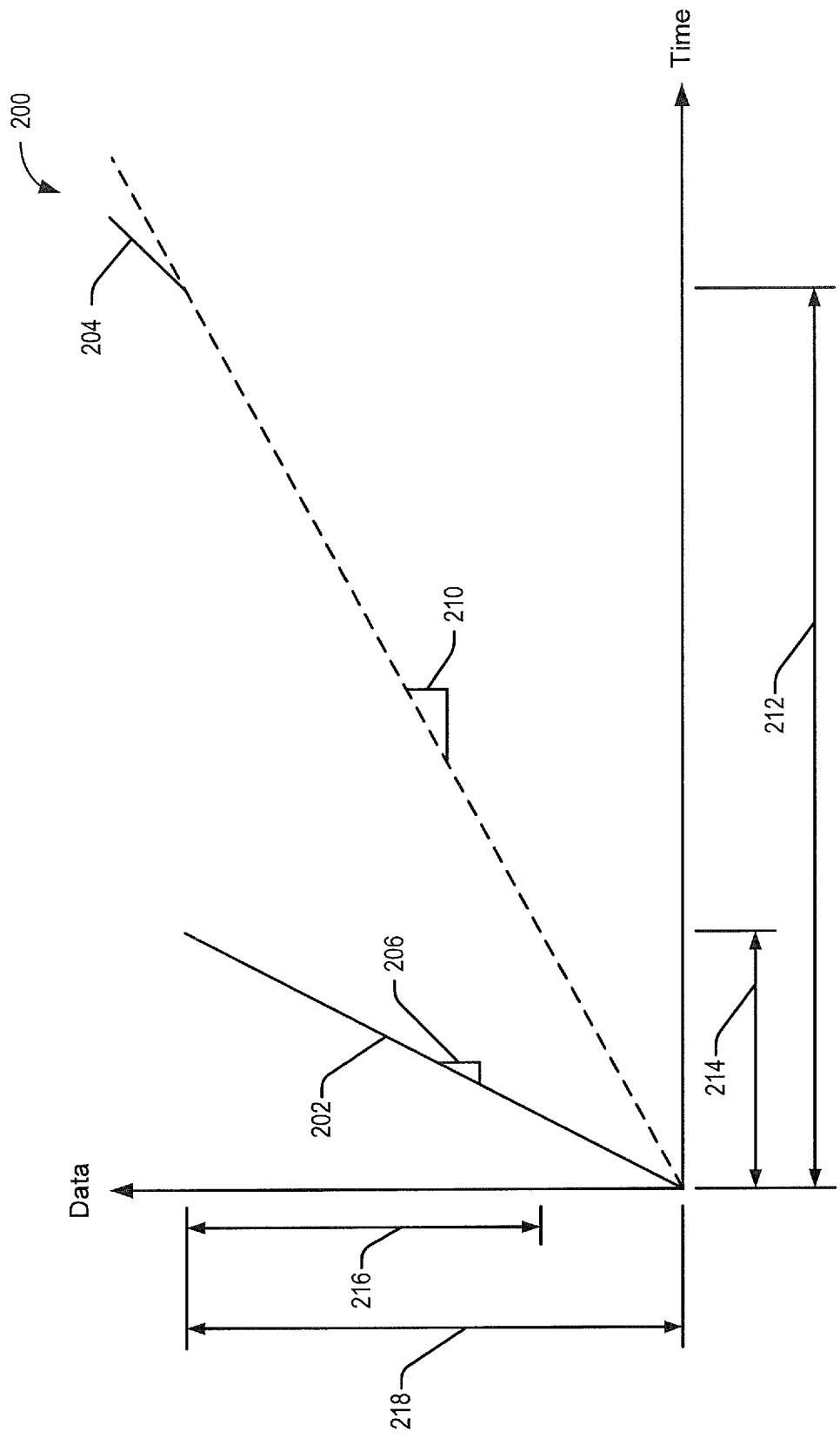
FIG. 2 is a representation of data versus time for a first data burst and a start of a second data burst during adaptive pacing of media content delivery over a wireless network.

FIG. 2 depicts a graphical representation 200 of data versus time for a first data burst 202 and a start of a second data burst 204 during adaptive pacing of media content delivery over a wireless network. The representation 200 depicts data bursts 202, 204 sent by the base station 106 of the system 100 depicted in FIG. 1 to the communication device 104. The first data burst 202 may be sent to the communication device 104 at a download rate 206. After the first data burst 202 is sent, no media content data is sent to the communication device 104 until a second time. A time period between the data bursts 202 and 204 is selected to send data at least at a playback rate of the media content (e.g., to prevent the communication device 104 from running out of data during playback of the media content). The time from initiation of the first data burst 202 to initiation of the second data burst 204 may be referred to as an effective burst time 212. An amount of time used to transmit the first data burst 202 may be referred to as a burst time 214. The effective burst time 212 and the burst time 214 are related to a data size 218 of the first data burst 202, the download rate 206, and the effective transfer rate 210 as follows:

$$D = t_b * R_d = t_e * R_e \qquad \text{Eqn. 1}$$

where:
D is the size 218 of the first data burst,
$t_b$ is the burst time 214,
$R_d$ is the download rate 206,
$t_e$ is the effective burst time 212, and
$R_e$ is the effective transfer rate 210.

A maximum amount of potential data wastage 216 during the first data burst 202 occurs at an end of the first data burst 202. The maximum amount of potential data wastage, $W_{max}$, 216 may be calculated by the following equation:

$$W_{max} = D * (1 - t_e/t_b) = D * (1 - R_e/R_d) \qquad \text{Eqn. 2}$$

A value for an acceptable amount of potential data wastage may be predetermined (e.g., as a setting stored at the base station 106) or may be selected based on conditions experienced by the base station, such as channel conditions, user demand, etc. The acceptable amount of potential data wastage may be substituted in Eqn. 2 to enable calculation of a first size based on a particular download rate $R_d$ determined from a particular channel quality indicator. The first size may correspond to an interest in limiting wastage of data in the event that playback of the media content is stopped. Thus, the first size may be a minimum data burst size of the first data burst 202.

In addition to calculating the first size, the base station may calculate a second size corresponding to an interest in efficiently using base station resources. The usage efficiency may be a function of the second size, the download rate, a type of communication protocol used by the communication device (e.g., a 2G standard compliant protocol, a 3G standard compliant protocol, a 4G standard compliant protocol, an LTE standard compliant protocol, etc.), usage of the base station by other communication devices, and other factors. The second size may be determined iteratively based on resource usage efficiency for a particular download rate $R_d$ determined from a particular channel quality indicator. Efficient utilization of base station resource is favored by using larger data bursts. Accordingly, the second size may be a maximum data burst size of the first data burst 202. The size 218 of the first data burst 202 may be selected based on the first size and the second size (e.g., using a weighted average, a look-up table, a two-factor optimization process, etc.).

After the base station 106 sends the first data burst 202, the base station 106 may determine an appropriate time to initiate the second data burst 204. The base station 106 may calculate the download rate, a first size (e.g., to limit waste data) for the second data burst 204 and the second size (e.g., to efficiently use base station resources) for the second data burst 204 based on channel quality information for the channel the base station uses to send data to the communication device. The base station 106 may determine a burst size of the second data burst 204 based on the first size and the second size. The base station 106 may determine the size of the second data burst from a look-up table, as an average of the first size and the second size, as a weighted average of the first size and the second size, or by a different method. The base station 106 may send the second data burst 204 beginning at the determined time. Thus, the base station 106 may adaptively select data burst sizes to balance competing interests of limiting waste data and using base station resources efficiently, based on channel conditions.

Figure 3:
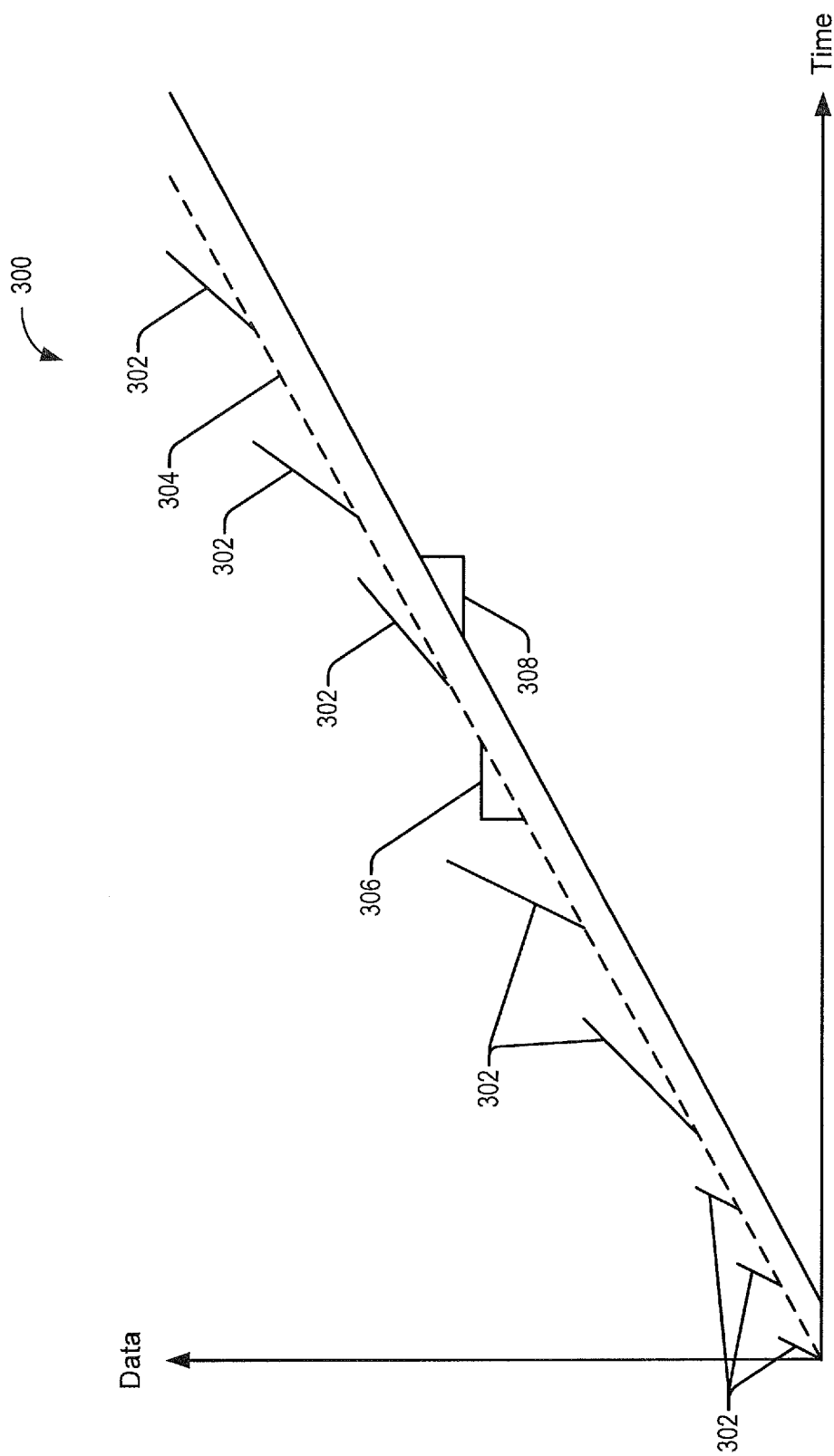
FIG. 3 is a representation of data versus time for a particular time span during adaptive pacing of media content delivery over a wireless network.

FIG. 3 depicts a graphical representation 300 of data versus time for a particular time span during adaptive pacing of media content delivery over a wireless network. The graphical representation 300 depicts data bursts 302 of media content sent by the base station 106 of the system 100 depicted in FIG. 1 to the communication device 104. Many of the data bursts 302 have different sizes and different download rates. The data bursts 302 are sent at times that maintain an effective transfer rate 306 of the media content at or above a playback rate 308 of the media content. Sizes of the data bursts 302 are selected to limit waste data and to efficiently use base station resources. For example, a size and download rate of each data burst may be selected based on channel conditions during a time period just prior to transmission of the data burst. In another example, a size and download rate of one or more data bursts may be selected based on other information, such as a portion of the media content that data to be sent in the data burst corresponds to. To illustrate, users may abandon playback of media content more frequently at a beginning or end of the media content. Accordingly, smaller bursts may be favored at the beginning and end of the media content than in the middle of playback of the media content.

Figure 4:
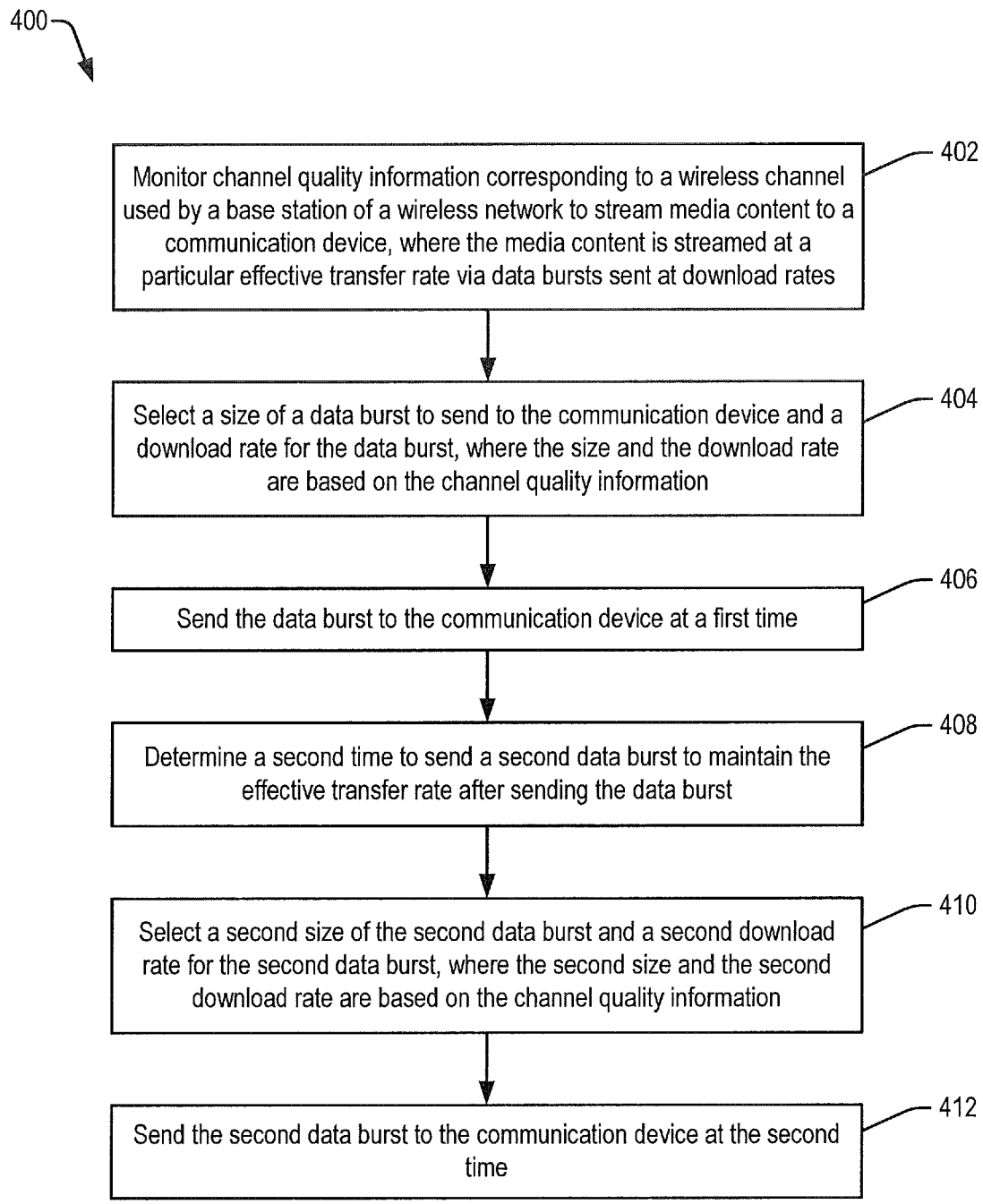
FIG. 4 is a flowchart of a first embodiment of a method to provide adaptive pacing of media content delivery over a wireless network.

Referring to FIG. 4, a flowchart of a first particular embodiment of a method 400 of adaptively pacing media content delivery over a wireless network is shown. The method 400 may be performed by a base station of a wireless network (e.g., the base station 106 of FIG. 1). At 402, the base station may monitor channel quality information corresponding to a wireless channel used by the base station to stream media content to a communication device. The media content may be streamed to the communication device at a particular effective transfer rate via data bursts sent at selected download rates.

The effective transfer rate may be determined based on a playback rate of the media content. For example, the effective transfer rate may be higher for high definition media content than for standard definition media content. In some embodiments, the effective transfer rate may be the playback rate. An initial quantity of data may be sent to the communication device to fill a buffer of the communication device sufficiently for the communication device to begin playback of the media content. After the buffer is filled, playback of the media content may be initiated at the communication device. In some embodiments, the effective transfer rate may be higher than the playback rate of the media content. When the effective transfer rate is higher than the playback rate, the effective transfer rate may be near in value to the playback rate to avoid a large amount of wasted data in the event the user stops playback of the media content before an end of the media content. In some embodiments, the effective playback rate may be reduced near the end of the media content to enable depletion of the buffer so that an end of a last data burst is near in time to an end of playback of the media content.

The channel quality information may be reported by the communication device, estimated by the base station, or both, based on data signals and control signals communicated between the base station and the communication device. In some embodiments, the base station may calculate a moving average of channel quality for a particular time interval based on the channel quality information.

The base station may select a size of a data burst to send to the communication device and a download rate for the data burst, at 404. The size of the data burst and the download rate for the data burst may be based on the channel quality information. The size of the data burst and the download rate for the data burst may be selected to limit wastage of data if the communication device stops playing the media content and may be selected to efficiently use base station resources. An embodiment of a method for determining the size of the data burst is described in more detail with reference to FIG. 5.

As shown in FIG. 4, the base station sends the data burst to the communication device at a first time, at 406. The first time may be a time when streaming of the media content to the communication device is initiated. Alternately, the first time may be a time calculated to maintain the effective transfer rate of the media content to the communication device.

The base station may determine a second time to send a second data burst to maintain the effective transfer rate after sending the data burst, at 408. The base station may also determine a second size of the second data burst and a second download rate for the second data burst, at 410. The second size and the second download rate may be based on updated channel quality information. For example, the updated channel quality information may indicate channel conditions during a time period just prior to the second time. The second size and the second download rate may be determined to limit data wastage and to efficiently use resources of the base station.

The base station may send the second data burst to the communication device at the second time, at 412. The base station may continue to determine when to send a next burst, continue to select a size of the next data burst and a download rate of the next burst based on measured channel conditions, and continue to send the next data burst at a time to maintain the effective transfer rate until playback of the media content is stopped or until the last data burst of the media content is sent to the media device.

Figure 5:
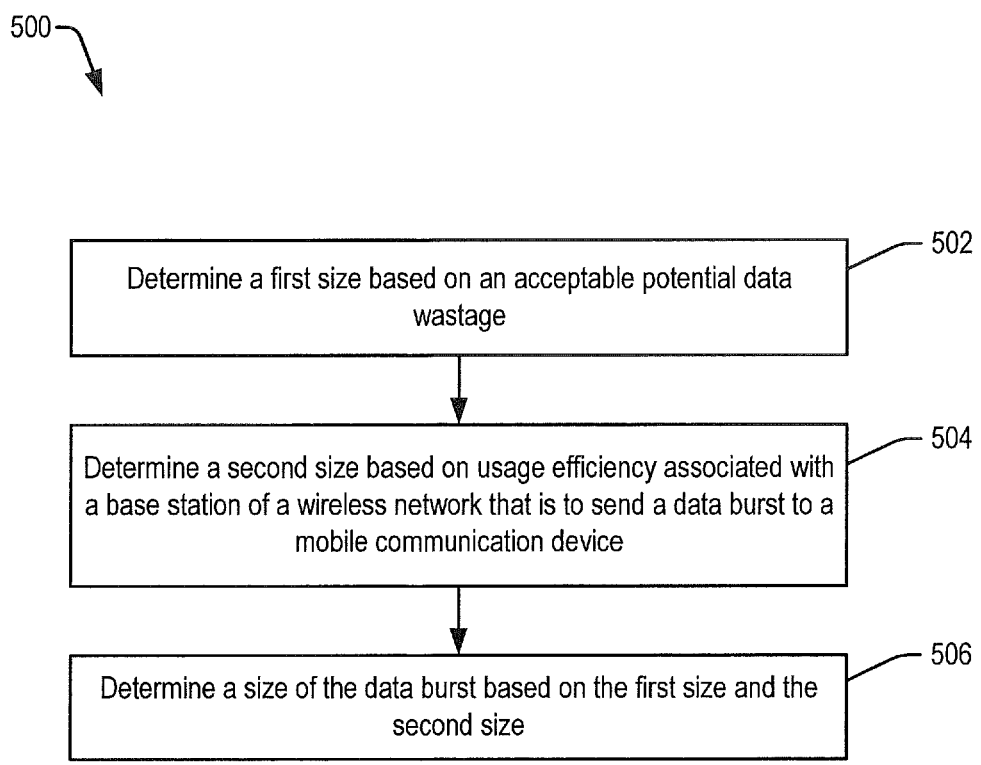
FIG. 5 is a flowchart of a second embodiment of a method to provide adaptive pacing of media content delivery over a wireless network.

Referring to FIG. 5, a flow chart of a second particular embodiment of a method 500 of adaptive pacing of media content delivery over a wireless network is shown. The method 500 may be performed by a base station to determine a size of a data burst to send to a communication device during streaming of the media content to the communication device. The base station may determine a download rate for the data burst based on channel quality information monitored by the base station. The channel quality information may include a moving average of a channel quality indicator (e.g., signal strength). The channel quality information may be used to determine the download rate. In a particular embodiment, the download rate for a time when a data burst is to be sent may be based on a value of the moving average of channel quality indicator when a size determination process is performed.

At 502, a first size may be determined based on acceptable potential data wastage and based on the download rate. The acceptable potential data wastage may be determined based on settings associated with the base station (e.g., a value stored at the base station), based on conditions experienced by the base station (e.g., user demand), based on other factors, or a combination thereof. Since smaller data bursts reduce potential data wastage, the first size determined based on the acceptable potential data wastage may correspond to a minimum data burst size. In some embodiments, the acceptable potential data wastage may be an amount of potential data wastage that is associated with smooth pacing of media content to the communication device.

The base station may determine a second size based on usage efficiency of resources of the base station, at 504. Since usage efficiency of the resources of the base station may be improved with larger data bursts, the second size may correspond to a maximum data burst size. The second size may be determined based on the download rate, a communication protocol used by the base station, usage of the base station by other communication devices, other factors, or a combination thereof.

The base station may determine a size of the data burst based on the first size and the second size, at 506. In an embodiment, the base station may determine the size as an average of the first size and the second size. In another embodiment, the base station may determine the size as a weighted average of the first size and the second size. In some embodiments, the base station may retrieve the size of the data burst from a look-up table based on the values of the first size, the second size, elapsed playback time of the media content, other data, or combinations thereof.

When the size of the data burst is based on a weighted average, weights may be determined based on trends (e.g., an abandonment rate or time) associated with the media content, based on viewing history data associated with the media content, based on viewing history data associated with the communication device, other information, or combinations thereof. For example, users may tend to abandon playback of the media content within a first time window from when the user begins watching the media content (e.g., within 30 seconds of initiation of playback of the media content, 1 minute of initiation of playback of the media content, 3 minutes of initiation of playback of the media content, or another time window size). To accommodate this trend, the base station may provide a large weight to the first size (e.g., 0.75) and a small weight to the second size (e.g., 0.25) during the first time window that includes the beginning of the media content to reduce potential data wastage. After the first time window, the user abandonment rate may decrease for a large portion of the media content. Accordingly, after the first time window, the base station may provide a small weight to the first size (e.g., 0.3) and a large weight to the second size (e.g., 0.7) to increase usage efficiency of base station resources. Near the end of the media content, the media content may play credits or other information not of interest to the user, which may increase the user abandonment rate. Thus, during a second window that includes the end of the media content, the base station may provide a large weight to the first size (e.g., 0.9) and a small weight to the second size (e.g., 0.1) to limit data wastage since it is likely that the user will stop play of the media content.

In a particular embodiment, viewing history data associated with the media content may be provided to the base station by a content provider that supplies the media content. As an example, the viewing history data may indicate percentages of users who were still viewing the media content at various points in the media content (e.g., at ⅙ intervals of the play time, at ⅛ intervals of the play time, at 1/10 intervals of the play time, at 1/16 intervals of the play time, or at other intervals of the play time). To illustrate, the viewing history data associated with the media content may indicate that 90% of the people who previously viewed the media content remained watching the media content when ⅜ of the media content was played, but only 55% of the people who previously viewed the media content remained watching the media content when ½ of the media content was played. Based on this viewing history data, the base station may provide a small weight to the first size (e.g., 0.2) and a large weight to the second size (e.g., 0.8) for the first ⅜ of the media content, and may provide a large weight to the first size (e.g., 0.8) and a small weight to the second size (e.g., 0.2) until the viewing history data associated with the media content indicates that the percentage of remaining viewers is not rapidly falling.

The viewing history data associated with the communication device may be provided to the base station by a service provider associated with the communication device, by the communication device, by another source, or by combinations thereof. The viewing history data associated with the communication device may indicate how much of media content streamed to the communication device is viewed before being stopped. The viewing history data associated with the communication device may be organized by genre of the media content, by length of the media content, by some other categorization, or by combinations thereof. As an example, a user of the communication device may watch a video during a morning commute to work by train. The viewing history data associated with the communication device may indicate that the user tends to watch 98% of media content when the length of the media content is 40 minutes or less and when the user views more than the first 2 minutes of the media content, and that the viewer tends to watch about 40 minutes of the media content when the media content is longer than 40 minutes and when the user views more than the first 2 minutes of the media content. Based on the viewing history data associated with the communication device the base station may provide a large weight to the first size during the first two minutes of the media content to limit data wastage. The base station may provide a large weight to the second size during a time after the first two minutes of the video content and before 40 minutes into the media content to efficiently use resources of the base station resource at a time when user abandonment is less likely. The base station may provide a large weight to the first size during a time near 40 minutes into the media content to accommodate an increased likelihood of the user stopping playback of the media content.

Various embodiments disclosed herein describe a base station of a wireless network that provides adaptive pacing of media content to a communication device. The base station may determine sizes of data bursts of media content and download rates of the data bursts to be sent to the communication device based on quality of a channel used by the base station to send the data bursts to the communication device. The size of the data bursts may be determined to limit data wastage and to efficiently use resources of the base station. Thus, adaptive pacing of the media content may decrease capacity of the wireless spectrum used to provide the media content, thereby freeing up capacity for other uses. This effective increase in capacity of the wireless spectrum may be used to allow other traffic in the wireless network or may be utilized to decrease congestion and interference in the wireless network. Increasing the efficiency of media content delivery may also delay capital expenditures needed to increase capacity of the wireless network.

Figure 6:
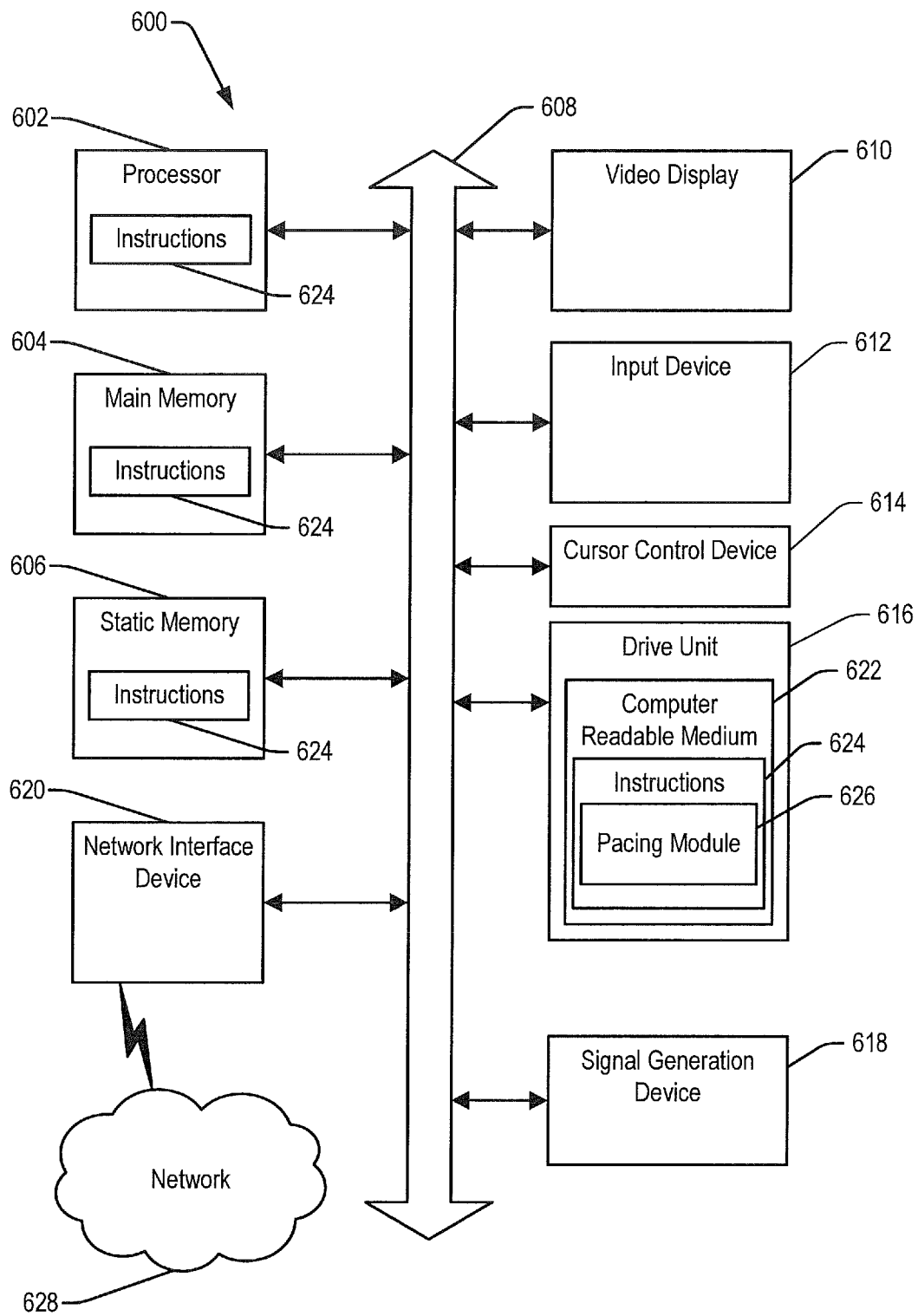
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the communication device 104, the base station 106, the content provider 126, the service provider 128, or combinations thereof described with reference to FIG. 1.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a flat panel display, a solid state display, or a lamp assembly of a projection system. Additionally, the computer system 600 may include an input device 612, such as a keyboard, and a cursor control device 614, such as a mouse. The computer system 600 may also include a drive unit 616, a signal generation device 618, such as a speaker or remote control, and a network interface device 620. Some computer systems 600 may not include an input device (e.g., a server may not include an input device).

In a particular embodiment, as depicted in FIG. 6, the drive unit 616 may include a computer-readable storage device 622 in which one or more sets of instructions 624, e.g. software, can be embedded. As used herein the term "computer-readable storage device" refers to an article at manufacture and excludes signals per se. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable storage devices. The instructions 624 in the drive unit 616, the main memory 604, the static memory 606, the processor 602, or combinations thereof may include a pacing module 626 that determines when to send data bursts, sizes of data bursts, and download rates for sending data bursts to one or more communication devices that are receiving, or are going to receive, streaming media content and that are in a coverage area of the computing system 600.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

The present disclosure includes a computer-readable storage device 622 that stores instructions 624 or receives, stores and executes instructions 624, so that a device connected to a network 628 may communicate voice, video or data over the network 628. While the computer-readable storage device is shown to be a single device, the term "computer-readable storage device" includes a single device or multiple devices, such as a centralized or distributed database, and/or associated caches and servers that store one or more sets of instructions. The term "computer-readable storage device" shall also include any device that is capable of storing a set of instructions for execution by a processor or that cause a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes or other storage device. Accordingly, the disclosure is considered to include any one or more of a computer-readable storage device and successor devices, in which data or instructions may be stored.

It should also be noted that software that implements the disclosed methods may optionally be stored on a computer-readable storage device, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
monitoring, at a base station of a wireless network, channel quality information corresponding to a wireless channel used by the base station to stream media content to a communication device, wherein the media content is streamed to the communication device at a particular effective transfer rate via data bursts;

selecting, at the base station, a size of a data burst to send to the communication device and a download rate for the data burst, wherein the size and the download rate are based on the channel quality information, and wherein the size of the data burst is selected based on potential data wastage if the communication device stops playing the media content and usage efficiency of base station resources associated with the base station; and sending the data burst to the communication device at a first time from the base station.

2. The method of claim 1, wherein the usage efficiency depends on a communication protocol used by the base station to communicate with the communication device.

3. The method of claim 1, wherein selecting the size of the data burst comprises:

determining a first size based on the potential data wastage;

determining a second size based on the usage efficiency; and determining the size based on the first size and the second size.

4. The method of claim 3, wherein determining the size based on the first size and the second size comprises determining a weighted average of the first size and the second size.

5. The method of claim 4, wherein the first size is weighted to a greater extent than the second size within a particular time window that includes a start time of playback of the media content.

6. The method of claim 4, wherein the first size is weighted to a greater extent than the second size within a particular time window that includes an end time of playback of the media content.

7. The method of claim 4, wherein the second size is weighted to a greater extent than the first size within a particular time not including a start of the media content and not including an end of the media content.

8. The method of claim 4, wherein a first weight applied to the first size, a second weight applied to the second size, or both, is based on viewing history data.

9. The method of claim 1, further comprising:

after sending the data burst, determining a second time to send a second data burst to maintain the effective transfer rate;

selecting a second size of the second data burst and a second download rate for the second data burst based on updated channel quality information; and sending the second data burst to the communication device at the second time.

10. The method of claim 1, wherein the particular effective transfer rate matches a playback rate of the media content.

11. The method of claim 1, wherein the particular effective transfer rate is greater than a playback rate of the media content.

12. An apparatus comprising:

a processor; and a memory coupled to the processor, the memory comprising instructions executable by the processor to perform operations comprising:

determining channel quality information corresponding to a wireless channel used by a base station to stream media content to a communication device, wherein the media content is streamed to the communication device at a particular effective transfer rate via data bursts; and selecting a size of a data burst to send to the communication device and a download rate for the data burst, wherein the size and the download rate are based on the channel quality information, and wherein the size of the data burst is selected based on potential data wastage if the communication device stops playing the media content and usage efficiency of base station resources associated with the base station.

13. The apparatus of claim 12, wherein selecting the size of the data burst comprises:

determining a first size based on the potential data wastage;

determining a second size based on the usage efficiency; and determining the size based on the first size and the second size.

14. The apparatus of claim 13, wherein determining the size based on the first size and the second size comprises determining the size based on a weighted average of the first size and the second size, and wherein weightings applied to the first size, the second size, or both, are determined based on viewing history data associated with the media content.

15. The apparatus of claim 12, wherein determining the channel quality information comprises receiving the channel quality information from the base station, and wherein the processor is a component of a network server.

16. A computer-readable storage device comprising instructions executable by a processor to perform operations including:

determining channel quality information corresponding to a wireless channel used by a base station to stream media content to a communication device, wherein the media content is streamed to the communication device at a particular effective transfer rate via data bursts; and selecting a size of a data burst to send to the communication device and a download rate for the data burst, wherein the size and the download rate are based on the channel quality information, and wherein the size of the data burst is selected based on potential data wastage if the communication device stops playing the media content and usage efficiency of base station resources associated with the base station.

17. The computer-readable storage device of claim 16, wherein the operations further include sending the size and the download rate for the data burst to the base station.

18. The computer-readable storage device of claim 16, wherein selecting the size of the data burst comprises:

determining a first size based on the potential data wastage;

determining a second size based on the usage efficiency; and determining the size based on the first size and the second size.

19. The computer-readable storage device of claim 18, wherein the usage efficiency depends on a communication protocol used by the base station to communicate with the communication device.

20. The computer-readable storage device of claim 19, wherein the communication protocol is compliant with a third generation mobile communication standard, a fourth generation mobile communication standard, or a long term evolution mobile communication standard.

* * * * *